United States Patent
Beloussov et al.

(10) Patent No.: US 10,904,022 B2
(45) Date of Patent: Jan. 26, 2021

(54) SYSTEM AND METHOD FOR UTILITY RANKING AND FUNDING FOR CLOUD STORAGE

(71) Applicant: Acronis International GmbH, Schaffhausen (CH)

(72) Inventors: Serguei Beloussov, Costa del Sol (SG); Oleg Melnikov, Kirkland, WA (US); Stanislav Protasov, Moscow (RU)

(73) Assignee: ACRONIS INTERNATIONAL GMBH, Schaffhausen (CH)

(*) Notice: Subject to any disclaimer, the term of this patent is extended or adjusted under 35 U.S.C. 154(b) by 0 days.

(21) Appl. No.: 16/548,376

(22) Filed: Aug. 22, 2019

(65) Prior Publication Data

US 2020/0076632 A1  Mar. 5, 2020

Related U.S. Application Data

(60) Provisional application No. 62/725,063, filed on Aug. 30, 2018.

(51) Int. Cl.
   *H04L 12/14* (2006.01)
   *G06Q 20/08* (2012.01)
   *H04L 12/24* (2006.01)
   *H04L 29/08* (2006.01)

(52) U.S. Cl.
   CPC ..... *H04L 12/1435* (2013.01); *G06Q 20/0855* (2013.01); *H04L 12/1403* (2013.01); *H04L 41/5022* (2013.01); *H04L 67/1097* (2013.01); *H04L 41/5096* (2013.01)

(58) Field of Classification Search
   CPC .......... H04L 12/1435; H04L 12/1403; H04L 41/5022; H04L 67/1097; H04L 41/5096; H04L 43/0876; H04L 43/16; H04L 41/0893; G06Q 20/0855; G06Q 20/145; H04M 15/8083; H04M 15/66; H04W 4/24
   See application file for complete search history.

(56) References Cited

U.S. PATENT DOCUMENTS

| | | | | |
|---|---|---|---|---|
| 8,601,083 | B1* | 12/2013 | Roche | G06F 16/1834 709/206 |
| 2013/0110581 | A1* | 5/2013 | Fanaru | G06F 11/3438 705/7.29 |
| 2014/0215574 | A1* | 7/2014 | Erb | H04L 63/10 726/4 |
| 2016/0065555 | A1* | 3/2016 | Branden | H04L 63/0807 726/7 |
| 2017/0371890 | A1* | 12/2017 | Seker | G06F 16/122 |
| 2019/0139080 | A1* | 5/2019 | Roy | G06Q 30/0244 |

* cited by examiner

*Primary Examiner* — Philip C Lee
(74) *Attorney, Agent, or Firm* — Arent Fox LLP; Michael Fainberg

(57) ABSTRACT

Disclosed herein are systems and methods for managing access to data objects in cloud storage. In one aspect, an exemplary method comprises, by a hardware processor, storing a first data object in a cloud storage service, wherein the first data object is uploaded by a first user, modifying a data access policy associated with the first data object to permit access by user accounts other than the first user, determining a utility ranking of the first data object based on a degree of access of the first data object using the cloud storage service, and modifying a data retention policy associated with the first data object based on the determined utility ranking.

17 Claims, 3 Drawing Sheets

SYSTEM AND METHOD FOR UTILITY RANKING AND FUNDING FOR CLOUD STORAGE

CROSS-REFERENCE TO RELATED APPLICATIONS

The present application claims benefit of priority to provisional U.S. Patent Application No. 62/725,063, filed on Aug. 30, 2018, entitled "System and Method for Utility Ranking and Funding for Cloud Storage", which is incorporated herein by reference.

FIELD OF TECHNOLOGY

The present disclosure relates generally to the field of storage technologies, more specifically, to systems and methods of determining a utility ranking for calculating third-party funding of cloud storage.

BACKGROUND

In the digital age, the pervasive use of computing devices and the Internet has generated vast amounts of data, which require storage in some storage devices. The value of some of this data is clear at the outset. For example, the value of financial data found in spreadsheets, written documentation in document files, photographs, or result data from scientific experiments, may be known at the outset. However, there is a class of data for which the value is unclear or unknown when the data is being gathered. For example, the data generated by an abundance of certain Internet-connected devices, e.g., video streams or recordings from webcams, may be rarely used by the user. The data may be stored locally, e.g., on the devices themselves, or on a cloud-based storage system. However, such use of storage resources to accommodate the ever-growing amount of data incurs a significant cost and consumes computing resources.

As such, there is a need for an improvement in technologies used for managing resources of a cloud-based storage and managing access to data in cloud storage—thereby improving utilization of resources.

SUMMARY

Aspects of the present disclosure relate to the field of data storage technologies, more specifically to systems and method managing access to data objects in cloud storage based on utility ranking of the data.

In one exemplary aspect, a method for managing access to data objects in cloud storage is implemented in a computer comprising a hardware processor, the method comprising: by a hardware processor, storing a first data object in a cloud storage service, wherein the first data object is uploaded by a first user, modifying a data access policy associated with the first data object to permit access by user accounts other than the first user, determining a utility ranking of the first data object based on a degree of access of the first data object using the cloud storage service, and modifying a data retention policy associated with the first data object based on the determined utility ranking.

According to one aspect of the disclosure, a system is provided for managing access to data objects in cloud storage, the system comprising a hardware processor configured to: store a first data object in a cloud storage service, wherein the first data object is uploaded by a first user, modify a data access policy associated with the first data object to permit access by user accounts other than the first user, determine a utility ranking of the first data object based on a degree of access of the first data object using the cloud storage service, and modify a data retention policy associated with the first data object based on the determined utility ranking.

In one exemplary aspect, a non-transitory computer-readable medium is provided storing a set of instructions thereon for managing access to data objects in cloud storage, wherein the set of instructions comprises instructions for: storing a first data object in a cloud storage service, wherein the first data object is uploaded by a first user, modifying a data access policy associated with the first data object to permit access by user accounts other than the first user, determining a utility ranking of the first data object based on a degree of access of the first data object using the cloud storage service, and modifying a data retention policy associated with the first data object based on the determined utility ranking.

In one aspect, the determination of the utility ranking of the first data object based on the degree of access of the first data object is for access of the first data object by the user accounts.

In one aspect, the utility ranking is determined based on a frequency of access by other user accounts, wherein the accessed data includes the first data object and other data objects uploaded to the cloud storage service by the first user.

In one aspect, the utility ranking is determined based on a volume of data accessed by other user accounts, wherein the accessed data includes the first data object and other data objects uploaded to the cloud storage service by the first user.

In one aspect, the modifying the data retention policy comprises, when the determined utility ranking reaches a first predetermined threshold value, increasing the data retention policy associated with the first data object, the increasing of the data retention policy comprising extending a duration of time for retaining the first data object stored on the cloud storage service.

In one aspect, the modifying the data retention policy comprises, when the determined utility ranking is below a second predetermined threshold value, deleting the first data object from the cloud storage service upon an expiration of a predetermined duration of time.

In one aspect, the modification of the data retention policy of the first data object is further based on utility rankings of other data objects uploaded to the cloud storage service by the first user.

The managing of access to data objects in cloud storage in accordance with the teachings of the present disclosure improves utilization of storage resources. The improvement in achieved by: storing a first data object in a cloud storage service, wherein the first data object is uploaded by a first user, modifying a data access policy associated with the first data object to permit access by user accounts other than the first user, determining a utility ranking of the first data object based on a degree of access of the first data object using the cloud storage service, and modifying a data retention policy associated with the first data object based on the determined utility ranking. Funding for cloud storage is obtained based on utility ranking of the data. Then, data that is not used may be appropriately discarded thereby conserving storage and computing resources.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing access to data objects in cloud storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
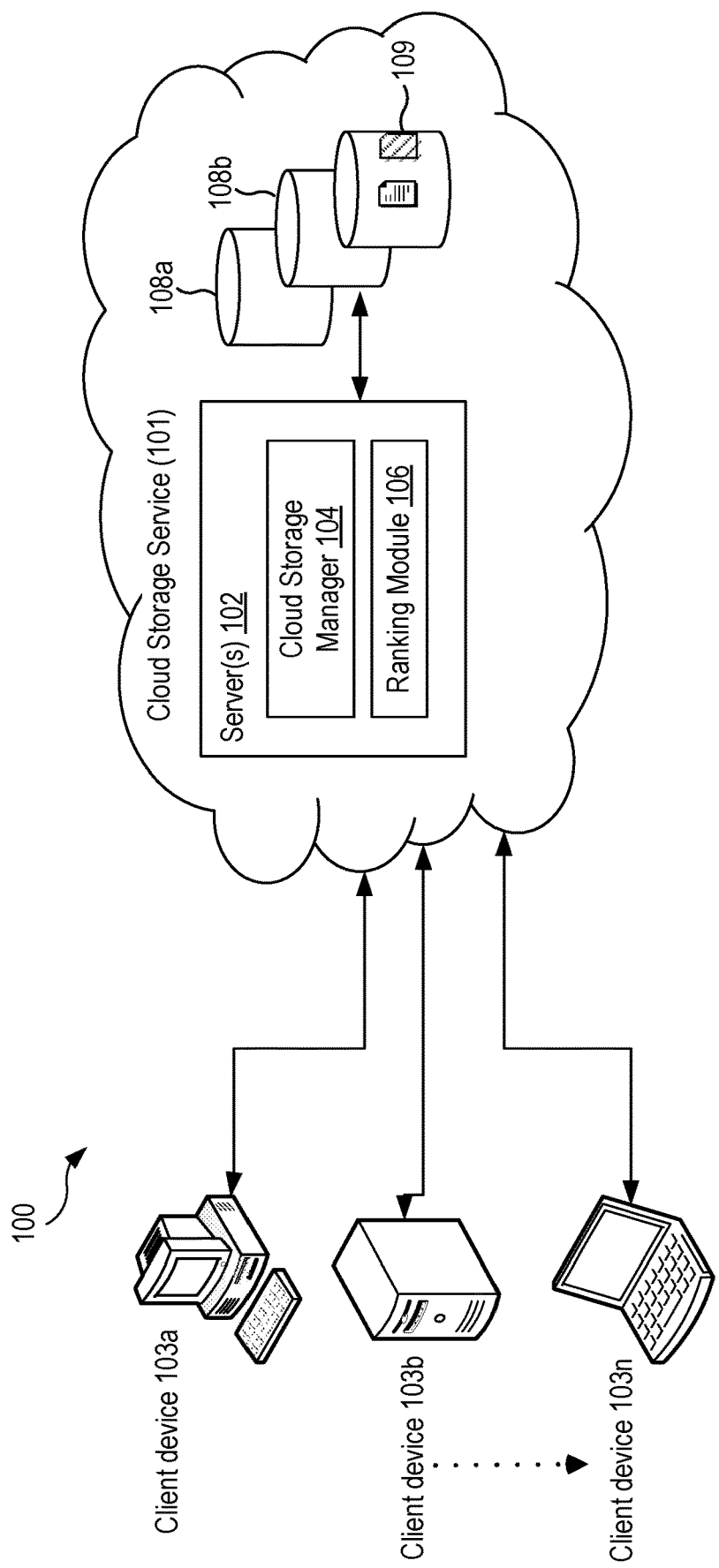
FIG. 1 is a block diagram illustrating an exemplary system for managing access to data objects in cloud storage in accordance with aspects of the present disclosure.

FIG. 1 is a block diagram illustrating an exemplary system 100 for managing access to data objects in cloud storage in accordance with aspects of the present disclosure. The system 100 includes a plurality of client devices 103a-103n communicatively connected to a cloud storage service 101 via a network (e.g., the Internet).

In one aspect, the cloud storage service 101 may include one or more servers 102 and storage devices 108a-108b configured to store one or more data objects 109. The storage devices 108a-108b may be abstracted using a variety of storage schemes to organize and store the data objects 109, such as a file-and-directory-based system (in which the data objects 109 are files), in a block-based storage, or in object-based storage. For simplicity of explanation, each client device of the client devices 103a-103n is associated with a single user or user account, though it is understood that in practice multiple user accounts may be logged into a single user device 103a, 103b, . . . ,103n. Each client device of the client devices 103a-103n may include a storage client (not shown) configured to log into the cloud storage service 101 (e.g., using a username and password credentials). It is noted that the system 100 may include any number of storage devices, servers, user devices, etc. As such, the client devices 103a-103n, the plurality of servers 102, the storage devices 108a-108b are only exemplary and any number of such devices may be includes in system 100.

In one aspect, the cloud storage service 101 may include a cloud storage manager 104 (e.g., executing on at least one of the servers 102) configured to manage a plurality of user accounts that are provided with access to the storage devices 108a-108b for storing one or more data objects 109 (i.e., files). In one aspect, the cloud storage manager 104 may maintain and enforce various account properties and policies for each user account, such as a storage quota (e.g., limiting each user account to 1 GB of storage in the cloud storage service), and an account credit system that indicates how a given user account pays for their data usage in the cloud storage system.

According to one aspect of the present disclosure, the cloud storage manager 104 may be configured to manage a storage system that uses a "usefulness" rank (i.e., "StoragerRank") of the data objects as a basis of a scheme for managing costs of the storage of the data. For example, suppose a user account X has a large volume of data. One approach for storing the large volume of data in the cloud storage is for the user to simply pay for the user account X. However, when the volume of data is large, the cloud storage may be too costly making directly paying for the cloud storage service cost prohibitive. Then, rather than simply paying for the user account, the user may elect to make the data available to other user accounts in the cloud storage service. When the other user accounts access the data associated with the user account X (i.e., access and pay for such access), the storage system may use this access as a credit for maintaining bandwidth and storage resources of the user account X.

In one aspect, the user may access the data periodically, pay for such access. Therefore, the user may provide the payment for storage of this data.

In one aspect, when the data storage is not financed in at least one of the ways described above (i.e., by the user paying for the storage and/or by the credit system) the data may be deleted automatically after a period of time. The length of time prior for the automatic deletion may be configured by the cloud service provider. In one aspect, a combination of the above methods of financing may be used. For example, the user may initially pay for storage of the data for a given time, and the credit may be used for extending the time.

In one aspect, the cloud storage service may include a ranking module 106 configured to determine and maintain utility rankings for data objects 109. In effect, the utility rankings indicates a degree of usefulness of a given piece of data is (i.e., to other users). The ranking module 106 may determine a utility ranking for a data object 109 based on a degree of access by the user accounts of the first data object using the cloud storage service.

In one aspect, the ranking module 106 may determine the utility ranking based on a frequency of access by the other user accounts to the data (e.g., 10 views per day). In one aspect, the ranking module 106 may determine the utility ranking(s) based on a volume of data accessed by the other user accounts to the data (e.g., 1 Mb per day).

Using such utility rankings, the cloud storage manager 104 may credit a given user account and/or modify the data retention policy for the given user account, on a per-file basis or for the entire account. For example, if the cloud storage manager 104 detects that the utility ranking of the data exceeds a certain threshold value, the data retention policy associated with the data may be modified, e.g., by increasing or extending a time associated with the data. In another example, when the cloud storage manager 104 detects that the utility ranking of the data falls below a given minimum threshold value, the data may be deleted. That is, when the data has not been accessed for a long time, its ranking decreases until the ranking falls below the minimum threshold level. Then, when the ranking is below the minimum threshold, the data is deleted.

In one aspect, the retention of data can be configured according to a plurality of predetermined and/or dynamically generated retention rules. In one aspect, the plurality of determined and/or generated retention rules include at least one of: a rule based on a frequency of access to the data, a rule based on a volume of accessed (or touched) data, and the like. In other words, the more users that use the data, the higher the resultant utility ranking of the data will be, and the longer the originating user account will be financed, and the longer the data can be stored. In one example retention rule, if 10% of the user's data was accessed over a given reporting period (e.g., one month), the cloud storage manager 104 may extend the retention of the data by 1 month; if 25% of the user's data was accessed over the given reporting period, then the retention of the data is extended by 3 months; and if 50% of the user's data was accessed over the given reporting period, then the retention of data is extended by 6 months.

In one example, a given user account may be configured to store video streams or video files generated by an Internet-connected security camera installed on the exterior of a house. Such data may include a video feed of cars driving by the house, or a highway. The operator of the user account (i.e., the user) may modify the access policy for all this video data to permit other users of the cloud storage service to access or view (but not modify) the video data. When other users find this video data useful and start accessing such data, the cloud storage service classifies this usefulness with a score, wherein the score is used to reward the originating user account with an allocation of storage resources and/or extending a time associated with the storage resources (i.e., increasing retention time).

In one aspect, the other users may include researchers that wish to incorporate the video data into an experiment or test study, technology companies that wish to use the data for training machine learning models such as for machine learning, etc. In one aspect, the shared data may include any type of data. For example, the shared data may be from datasets gathered from sensors, such as sensor data from a privately-installed weather station that records an exact air temperature every 10 seconds of the day for years.

Figure 2:
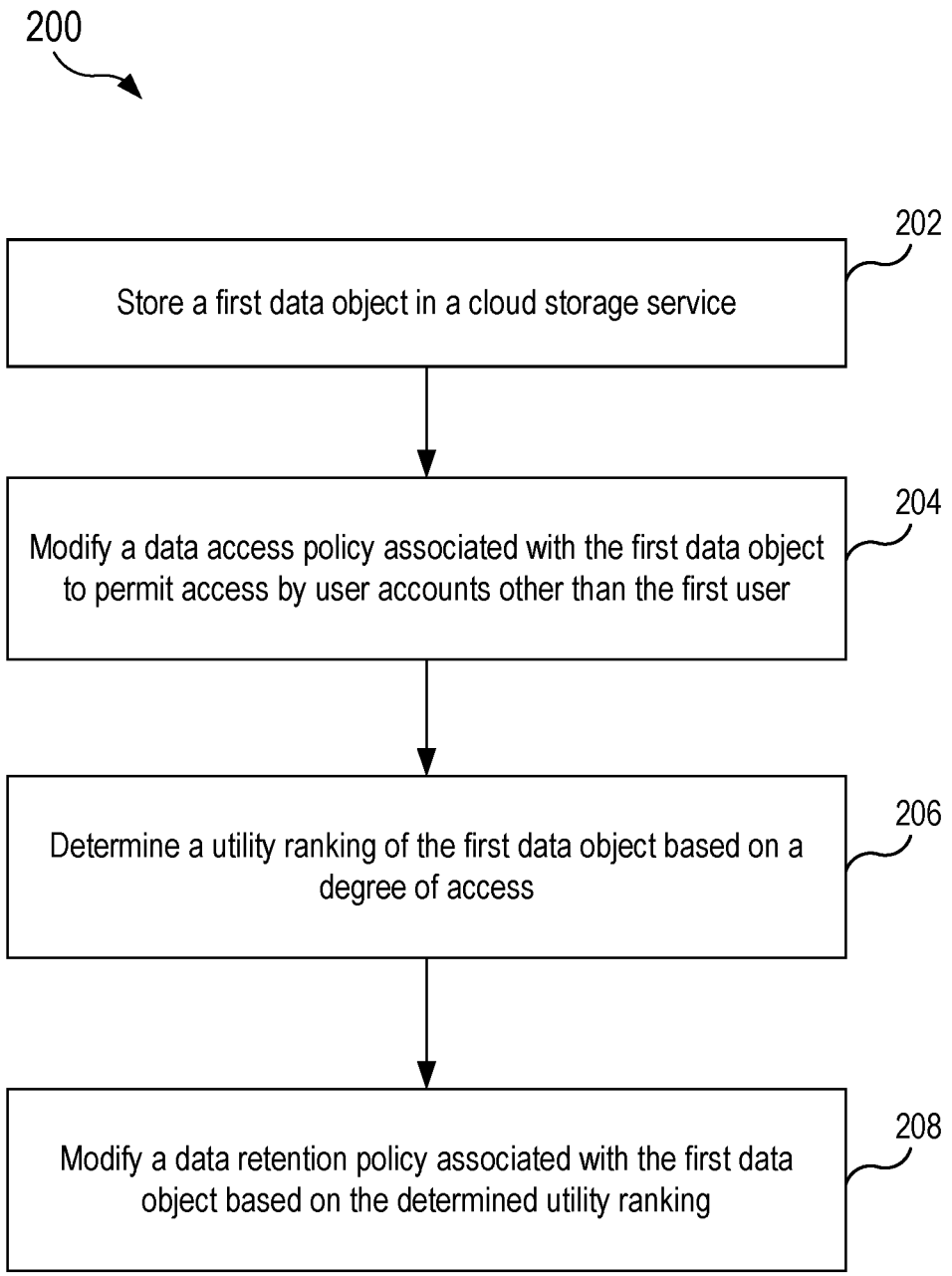
FIG. 2 is a flowchart illustrating a method for managing access to data objects in cloud storage in accordance with aspects of the present disclosure.

FIG. 2 is a flowchart illustrating a method 200 for managing access to data objects in cloud storage in accordance with aspects of the present disclosure. It is noted that the following description of the exemplary method makes reference to the system and components described above.

In step 202, the cloud storage service 101 may store a first data object in a cloud storage service. The first data object may be uploaded by a first user. For example, the first data object may be associated with a first user account.

In step 204, the cloud storage manager 104 may modify a data access policy associated with the first data object to permit access by user accounts other than the first user. For example, the data access policy may be modified based on the user electing a particular policy.

In step 206, the ranking module 106 determines a utility ranking of the first data object based on a degree of access of the first data object using the cloud storage service.

In one aspect, the determination of the utility ranking of the first data object based on the degree of access of the first data object is for access of the first data object by the user accounts.

In one aspect, the utility ranking is determined based on a frequency of access by other user accounts, wherein the accessed data includes the first data object and other data objects uploaded to the cloud storage service by the first user.

In one aspect, the utility ranking is determined based on a volume of data accessed by other user accounts, wherein the accessed data includes the first data object and other data objects uploaded to the cloud storage service by the first user.

In step 208, the ranking module 106 modifies a data retention policy associated with the first data object based on the determined utility ranking.

In one aspect, when the determined utility ranking reaches a first predetermined threshold value, the cloud storage manager 104 increases the data retention policy associated with the first data object. The increasing of the data retention policy comprises extending a duration of time for retaining the first data object stored on the cloud storage service. In other words, the first data object is kept stored on the cloud storage in accordance with the latest data retention policy of the first data object.

In one aspect, when the determined utility ranking is below a second predetermined threshold value (e.g., a minimum threshold), the cloud storage manager 104 deletes the first data object from the cloud storage service upon an expiration of a predetermined duration of time. In one aspect, the predetermined duration of time may be given as a specific duration of time (e.g., one month) or as a number of reporting intervals (e.g., one reporting intervals, two consecutive reporting intervals, five consecutive reporting intervals, and the like). For example, if the predetermined duration of time is two reporting intervals, the ranking falls below the second predetermined threshold value, and the ranking remains below the second threshold value for two consecutive reporting intervals, the cloud storage manager 104 deletes the first data object from the cloud storage service.

In one aspect, the cloud storage manager 104 may increase a credit amount associated with the first user based on the determined utility ranking of the first data object stored in the cloud storage service.

In one aspect, the modification of the data retention policy of the first data object is further based on utility rankings of other data objects uploaded to the cloud storage service by the first user.

Figure 3:
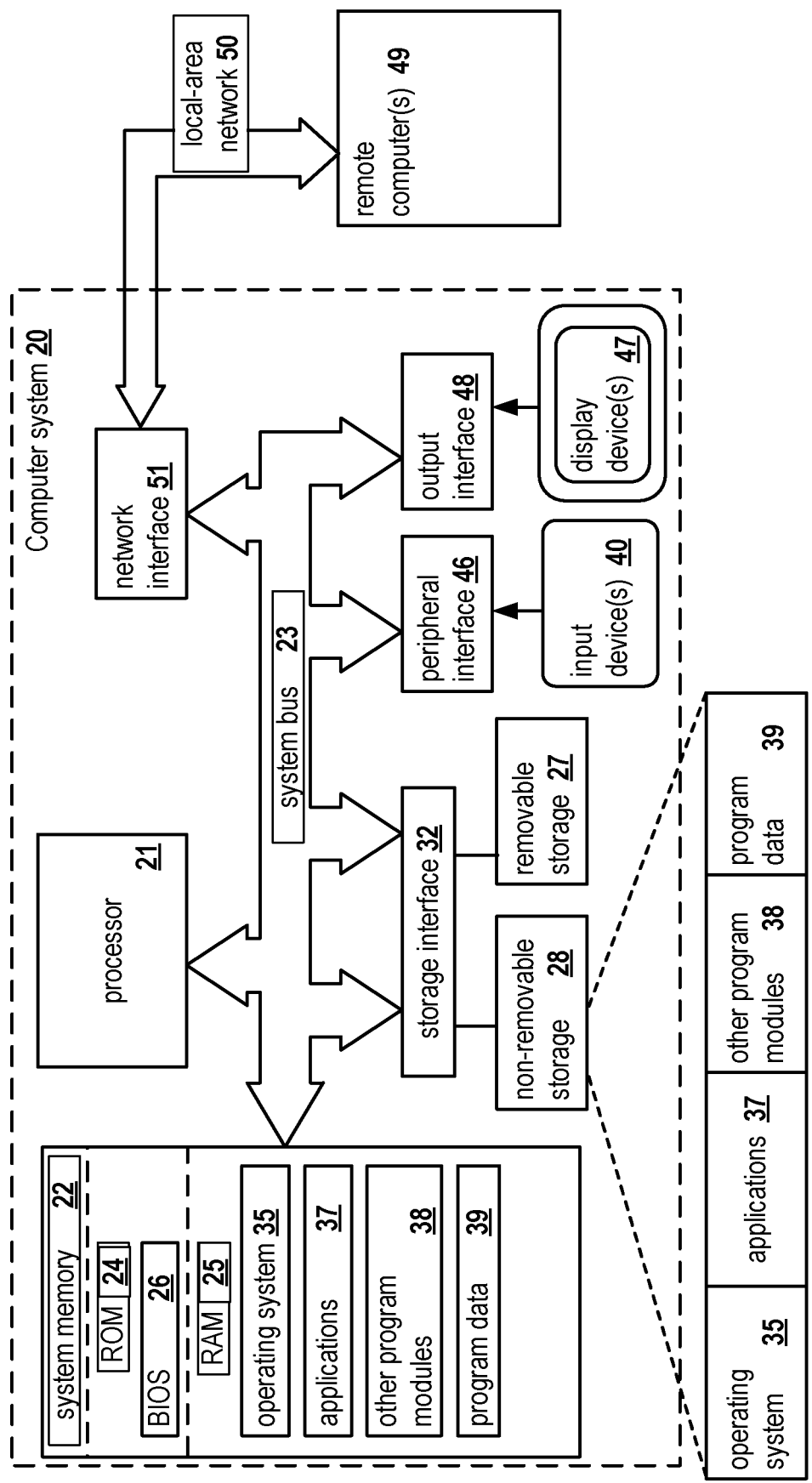
FIG. 3 presents an example of a general-purpose computer system on which aspects of the present disclosure can be implemented.

FIG. 3 presents an example of a general-purpose computer system 20 on which aspects of the present disclosure can be implemented. It should be noted that the computer system 20 can correspond to the client devices 103 and physical servers 102, for example, as described above. It should be noted that the computer system 20 can also correspond to a virtual machine on a computing device, for example, as described earlier the intercepting module may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for managing access to data objects in cloud storage, comprising:
   storing, by a processor, a first data object in a storage device of a cloud storage service for a duration of time, wherein the first data object is uploaded by a first user account;
   modifying, by the processor, a data access policy associated with the first data object to permit access to the first data object by other user accounts different from the first user account;
   determining, by the processor, a utility ranking of the first data object based on a degree of access of the first data object by the other user accounts using the cloud storage service; and
   determining, by the processor, a data retention policy associated with the first data object based on the determined utility ranking, wherein the data retention policy indicates:
      extending the duration of time for retaining the first data object on the storage device, wherein the duration of time is extended to (1) a first extended duration when the utility ranking meets a target threshold value during the duration of time and (2) a second extended duration when the utility ranking meets a different target threshold value during the duration of time.

2. The computer-implemented method of claim 1, wherein the utility ranking is determined based on a frequency of access by the other user accounts.

3. The computer-implemented method of claim 1, wherein the utility ranking is determined based on a volume of data accessed by the other user accounts.

4. The computer-implemented method of claim 1, wherein the data retention policy further indicates: when the determined utility ranking is below a second predetermined threshold value, deleting the first data object from the cloud storage service upon an expiration of the duration of time.

5. The computer-implemented method of claim 1, further comprising modifying of the data retention policy of the first data object based on utility rankings of other data objects uploaded to the storage device of the cloud storage service by the first user account.

6. A system for managing access to data objects in cloud storage, comprising:
   at least one processor configured to:
      store a first data object in a storage device of a cloud storage service for a duration of time, wherein the first data object is uploaded by a first user account;
      modify a data access policy associated with the first data object to permit access to the first data object by other user accounts different from the first user account;
      determine a utility ranking of the first data object based on a degree of access of the first data object by the other user accounts using the cloud storage service; and
   determine a data retention policy associated with the first data object based on the determined utility ranking, wherein the data retention policy indicates:
      extending the duration of time for retaining the first data object on the storage device, wherein the duration of time is extended to (1) a first extended duration when the utility ranking meets a target threshold value during the duration of time and (2) a second extended duration when the utility ranking meets a different target threshold value during the duration of time.

7. The system of claim 6, wherein the utility ranking is determined based on a frequency of access by the other user accounts.

8. The system of claim 6, wherein the utility ranking is determined based on a volume of data accessed by the other user accounts.

9. The system of claim 6, wherein the data retention policy further indicates: when the determined utility ranking is below a predetermined threshold value, deleting the first data object from the cloud storage service upon an expiration of the duration of time.

10. The system of claim 6, further comprising modifying the data retention policy of the first data object based on utility rankings of other data objects uploaded to the storage device of the cloud storage service by the first user account.

11. A non-transitory computer readable medium storing thereon computer executable instructions for managing access to data objects in cloud storage, including instructions for:

storing, by a processor, a first data object in a storage device of a cloud storage service for a duration of time, wherein the first data object is uploaded by a first user account;

modifying, by the processor, a data access policy associated with the first data object to permit access to the first data object by other user accounts different from the first user account;

determining, by the processor, a utility ranking of the first data object based on a degree of access of the first data object by the other user accounts using the cloud storage service; and determining, by the processor, a data retention policy associated with the first data object based on the determined utility ranking, wherein the data retention policy indicates:

extending the duration of time for retaining the first data object on the storage device, wherein the duration of time is extended to (1) a first extended duration when the utility ranking meets a target threshold value during the duration of time and (2) a second extended duration when the utility ranking meets a different target threshold value during the duration of time.

12. The non-transitory computer readable medium of claim 11, wherein the utility ranking is determined based on a frequency of access by the other user accounts.

13. The non-transitory computer readable medium of claim 11, wherein the utility ranking is determined based on a volume of data accessed by the other user accounts.

14. The non-transitory computer readable medium of claim 11, wherein the data retention policy further indicates:
when the determined utility ranking is below a predetermined threshold value, deleting the first data object from the cloud storage service upon an expiration of the duration of time.

15. The non-transitory computer readable medium of claim 11, further comprising modifying of the data retention policy of the first data object based on utility rankings of other data objects uploaded to the storage device of the cloud storage service by the first user account.

16. The computer-implemented method of claim 1, wherein the utility ranking is indicative of an amount of the first data object accessed by the other user accounts.

17. The computer-implemented method of claim 1, wherein a credit provided to the first user account for storing the first data object on the storage device is a function of the utility ranking, and wherein the data retention policy further indicates:
extending the duration of time for retaining the first data object on the storage device when the credit is equal to at least a cost for storing the first data object on the storage device.

* * * * *